(12) United States Patent
Masuyama et al.

(10) Patent No.: US 9,920,825 B2
(45) Date of Patent: Mar. 20, 2018

(54) DEVICE FOR MEASURING MOVING RANGE OF SIDE GEAR

(71) Applicant: TOYOTA JIDOSHA KABUSHIKI KAISHA, Toyota-shi, Aichi (JP)

(72) Inventors: Takahisa Masuyama, Okazaki (JP); Kenichi Saho, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 15/036,073

(22) PCT Filed: Oct. 28, 2014

(86) PCT No.: PCT/JP2014/078665
§ 371 (c)(1),
(2) Date: May 12, 2016

(87) PCT Pub. No.: WO2015/083462
PCT Pub. Date: Jun. 11, 2015

(65) Prior Publication Data
US 2016/0290465 A1 Oct. 6, 2016

(30) Foreign Application Priority Data
Dec. 2, 2013 (JP) .................................. 2013-249662

(51) Int. Cl.
*F16H 48/08* (2006.01)
*G01M 13/02* (2006.01)

(52) U.S. Cl.
CPC ............ *F16H 48/08* (2013.01); *G01M 13/02* (2013.01)

(58) Field of Classification Search
CPC ................................ F16H 48/08; G01M 13/02
See application file for complete search history.

(56) References Cited

U.S. PATENT DOCUMENTS

| | | | | |
|---|---|---|---|---|
| 2,911,855 A * | 11/1959 | Opocensky | ........... | F16C 35/063 384/537 |
| 3,708,857 A * | 1/1973 | Pfeiffer | ................. | F16H 48/08 29/407.05 |
| 5,400,506 A * | 3/1995 | Ichiki | ...................... | B23P 19/04 29/791 |
| 2015/0176693 A1* | 6/2015 | Masuyama | ............. | F16H 48/38 29/893.2 |

(Continued)

FOREIGN PATENT DOCUMENTS

| | | |
|---|---|---|
| EP | 2604890 A1 | 6/2013 |
| JP | S59-90807 U | 6/1984 |
| JP | H10-2150 A | 1/1998 |

(Continued)

*Primary Examiner* — Francis Gray
(74) *Attorney, Agent, or Firm* — Oliff PLC

(57) ABSTRACT

A moving range measurement device of a side gear used in a differential unit, the differential unit including: a differential case; a side gear arranged inside the differential case; and a spring that biases the side gear in a direction parallel to a central axis, in which: the device includes: a jig in which a slope is formed, the jig being slidable in a direction vertical to the central axis of the side gear; and an actuator that slides the jig, and the actuator slides the jig to make the jig move toward the side gear in a state in which the slope is in contact with the side gear, to thereby move the side gear along the slope.

4 Claims, 7 Drawing Sheets

(56) References Cited

U.S. PATENT DOCUMENTS

2016/0116052 A1* 4/2016 Mori .................. F16H 57/0427
  475/160
2016/0273638 A1* 9/2016 Ishihara ................ F16H 48/38

FOREIGN PATENT DOCUMENTS

| JP | H10-184851 A | 7/1998 |
| JP | H11-94703 A | 4/1999 |
| JP | 2011-247300 A | 12/2011 |
| JP | 2013-127280 A | 6/2013 |

* cited by examiner

DEVICE FOR MEASURING MOVING RANGE OF SIDE GEAR

TECHNICAL FIELD

The present invention relates to a technique of a device for measuring a moving range of a side gear.

BACKGROUND ART

Conventionally, there is known a differential unit for absorbing a difference in rotational speed between left and right wheels. The differential unit mainly includes a differential case, a pair of pinion gears which rotate together with the differential case (revolution), and a pair of side gears engaged with the pinion gears. The differential unit absorbs the difference in rotational speed between the left and right wheels by utilizing a fact that rotational speeds of the respective side gears change when the pinion gears rotate (rotation).

There is a differential unit that includes a spring between a differential case and a side gear, wherein the side gear is biased (see, for example, Patent Literature 1). Such a differential unit has an advantage that when the side gear hits the differential case, a contraction of the spring enables impact forces to be attenuated. However, since the contraction of the spring allows the side gear to move, it is required to separately provide a process of measuring the moving range of the side gear and determining whether the moving range of the side gear that has been measured is appropriate.

In the above process, a moving range measurement device capable of measuring the moving range of the side gear is used. The moving range measurement device includes a mechanism that comes close to the side gear in a direction vertical to a central axis direction of the side gear and presses the side gear in a direction parallel to the central axis direction. However, there is a problem that such a moving range measurement device is expensive since it includes a complicated mechanism including a plurality of actuators. Another problem is that, since it is required to insert a part of the mechanism into the differential case and press the side gear in the direction perpendicular to the direction in which the mechanism is inserted into the differential case, it is difficult to measure the moving range of the side gear.

CITATION LIST

Patent Literature

[Patent Literature 1] Japanese Unexamined Patent Application Publication No. 2013-127280

SUMMARY OF INVENTION

Technical Problem

The present invention aims to provide a device for measuring a moving range of a side gear including a simple mechanism formed of one or a small number of actuators at a reduced cost. The present invention also aims to provide a device for measuring a moving range of a side gear in which a measurement can be easily carried out.

Solution to Problem

The problems solved by the present invention have been described above. The means for solving the above problems will now be described.

A device for measuring a moving range of a side gear according to a first aspect of the present invention is a device for measuring a moving range of a side gear used in a differential unit, the differential unit including: a differential case; a side gear arranged inside the differential case; and a spring that biases the side gear in a direction parallel to a central axis direction of the side gear, in which: the device includes: a jig in which a slope is formed, the jig being slidable in a direction vertical to the central axis direction of the side gear; and an actuator that slides the jig, and the actuator slides the jig to make the jig move toward the side gear in a state in which the slope of the jig is in contact with the side gear, to thereby move the side gear along the slope.

In the device for measuring the moving range of the side gear according to the second aspect of the present invention, the side gear is a bevel gear, and the slope is in contact with a top land of the side gear.

In the device for measuring the moving range of the side gear according to the third aspect of the present invention, a controller capable of recognizing a sliding speed of the jig is further included, in which the controller stops the actuator when the sliding speed of the jig rapidly decreases.

In the device for measuring the moving range of the side gear according to the fourth aspect of the present invention, a controller is further included, the actuator includes an electric motor, and the controller is configured to be able to recognize a voltage of the electric motor and stops the actuator when the voltage of the electric motor rapidly increases.

Advantageous Effects of Invention

The present invention achieves the following effects.

According to the first aspect of the present invention, it is possible to move, using only the actuator that slides the jig in one direction, the side gear in another direction. Accordingly, the moving range measurement device has a simple mechanism formed of one or a small number of actuators, whereby the cost can be reduced. Further, since it is sufficient that the jig be slid and inserted into the differential case, the measurement can be easily carried out.

According to the second aspect of the present invention, there is no need to provide a part with which the jig comes into contact in the side gear. It is therefore possible to use the device without changing the structure or the components of the differential unit.

According to the third aspect of the present invention, it is possible to recognize the limit of movement of the side gear. It is therefore possible to measure the moving range of the side gear.

According to the fourth aspect of the present invention, it is possible to recognize the limit of movement of the side gear. It is therefore possible to measure the moving range of the side gear.

DESCRIPTION OF EMBODIMENTS

First, a typical differential unit 1 will be briefly described.

Figure 1:
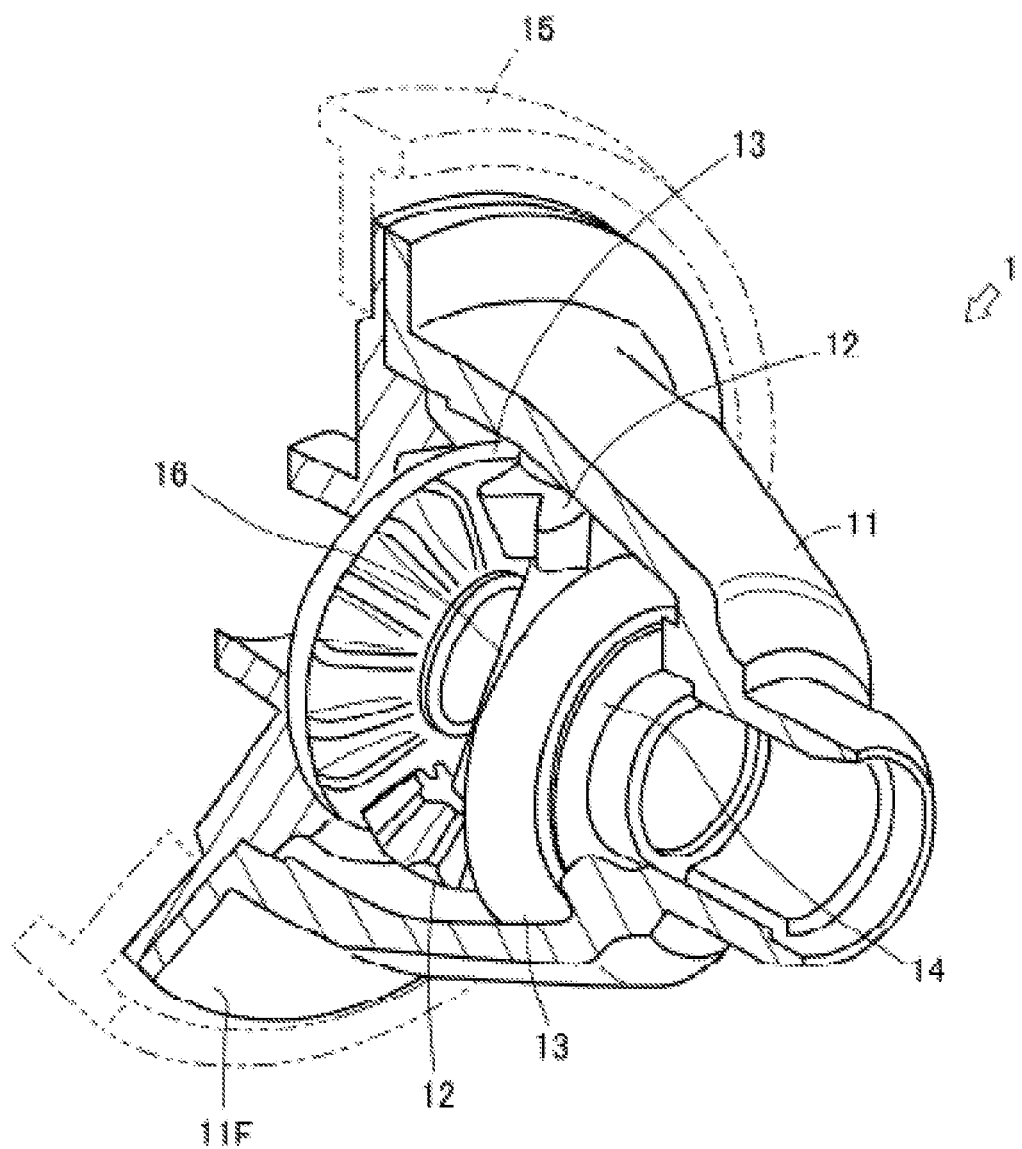
FIG. 1 is a diagram showing a differential unit.
Figure 2:
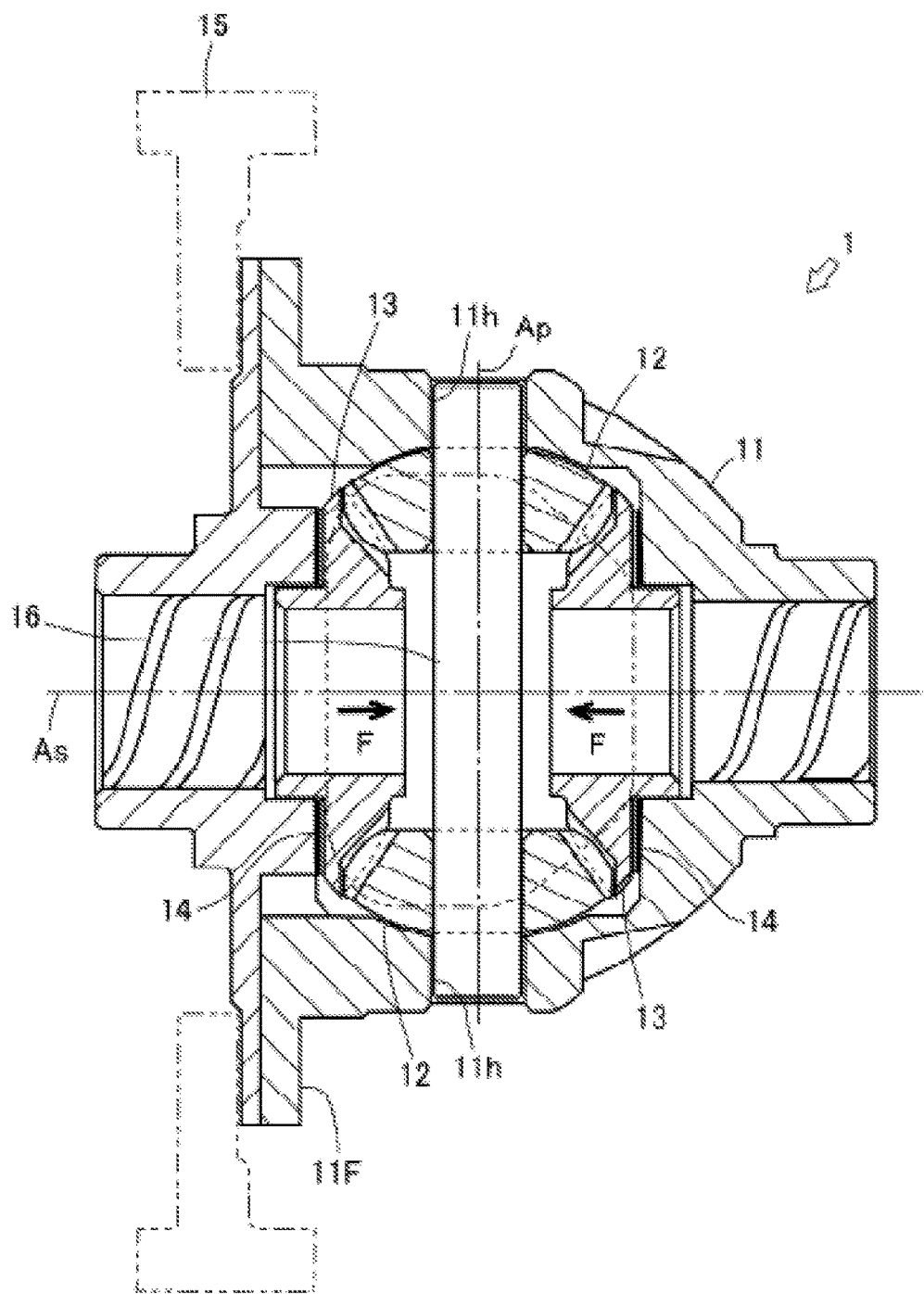
FIG. 2 is a diagram showing an internal structure of the differential unit.
Figure 3:
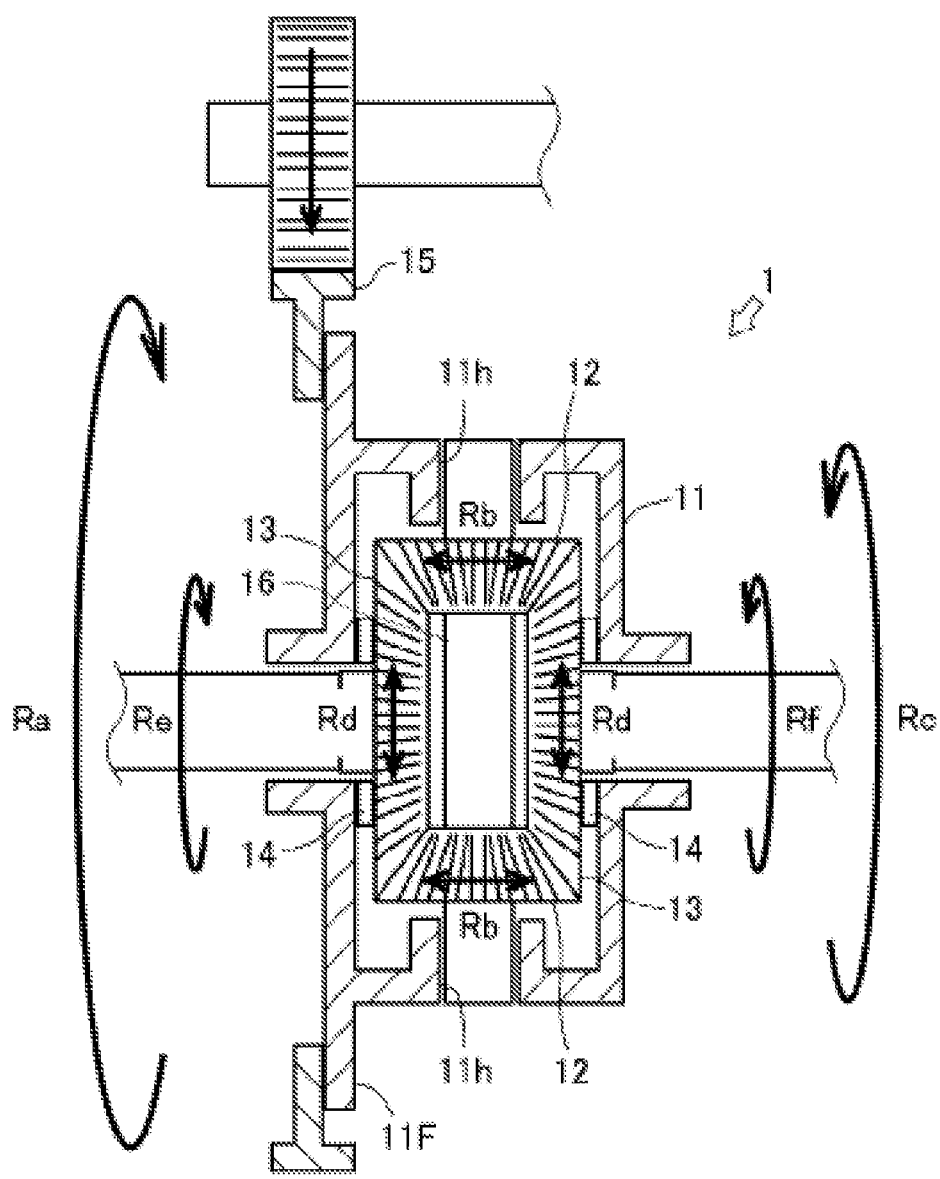
FIG. 3 is a diagram showing how the differential unit operates.

FIG. 1 shows the differential unit 1. FIG. 2 shows an internal structure of the differential unit 1. FIG. 3 shows how the differential unit 1 operates.

The differential unit 1 absorbs a difference in rotational speed between left and right wheels. The differential unit 1 includes a differential case 11, pinion gears 12, and side gears 13.

The differential case 11 is a hollow component. The differential case 11 has a flange 11F at one end portion thereof, and a final gear 15 is attached to the flange 11F. The differential case 11 rotates integrally with the final gear 15 (see arrow Ra in FIG. 3).

The pinion gears 12 are arranged in the differential case 11. In the present embodiment, the differential unit 1 includes a pair of pinion gears 12 facing each other. The pair of pinion gears 12 are rotatably supported by a pinion shaft 16 (see arrow Rb in FIG. 3). The pinion shaft 16 is supported while inserted in a shaft hole 11h of the differential case 11. Therefore, the pinion gears 12 rotate together with the differential case 11 (see arrow Rc in FIG. 3). When the pinion gears 12 rotate on the pinion shaft 16, this motion is referred to as "rotation", and when the pinion gears 12 rotate together with the differential case 11, this motion is referred to as "revolution". The pinion gears 12 are so-called bevel gears.

The side gears 13 are arranged in the differential case 11. The differential unit 1 includes a pair of side gears 13 facing each other. The pair of side gears 13 are rotatably supported while engaged with the respective pinion gears 12 (see arrow Rd in FIG. 3). Therefore, the side gears 13 rotate as the pinion gears 12 rotate (revolution) (see arrows Re and Rf in FIG. 3). When the pinion gears 12 rotate (rotation) in this state, rotational speeds of the respective side gears 13 change. Concretely, when the pinion gears 12 rotate (rotation) in one direction, a relationship between the rotational speeds of the respective side gears 13 become Re<Rf. On the other hand, when the pinion gears 12 rotate (rotation) in the other direction, the relationship between the rotational speeds of the respective side gears 13 become Re>Rf. The side gears 13 are so-called bevel gears.

In this manner, the differential unit 1 can absorb the difference in the rotational speed between the left and right wheels by utilizing a fact that the rotational speeds of the respective side gears 13 change when the pinion gears 12 rotate (rotation).

The differential unit 1 further includes a spring 14.

The spring 14 is arranged in the differential case 11. In the differential unit 1, the spring 14 is arranged between the differential case 11 and the side gears 13. The spring 14 biases the side gears 13 in parallel to a central axis direction (axial center direction of a central axis As) (see arrow F of FIG. 2). Therefore, the side gears 13 are pressed against the pinion gears 12 and thus a free movement of the side gears 13 toward the differential case 11 is limited. Further, when the side gears 13 move toward the differential case 11, the moving speed of the side gears 13 is reduced by the spring 14. That is, the contraction of the spring 14 weakens the forces of the movement of the side gears 13 toward the differential case 11. The spring 14 is a so-called conical spring washer.

As described above, in the differential unit 1, the contraction of the spring 14 attenuates the impact forces when the side gears 13 hit the differential case 11.

Next, a moving range measurement device 2, which is the present invention, will be described.

Figure 4:
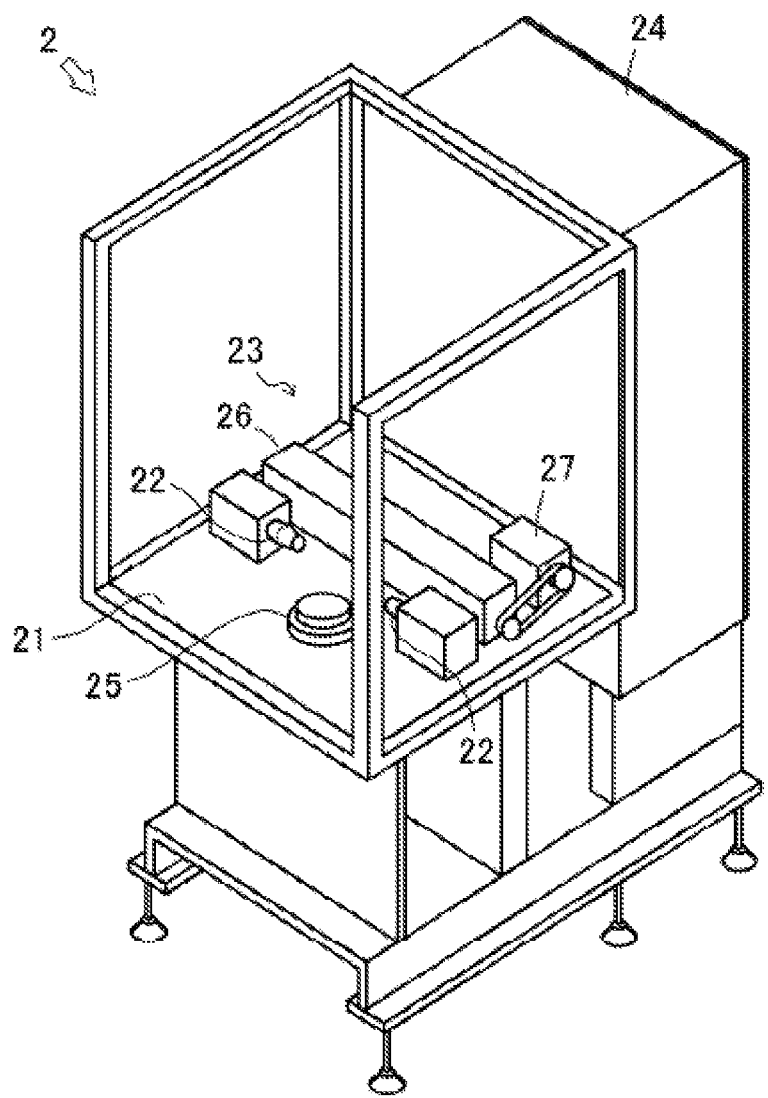
FIG. 4 is a diagram showing a moving range measurement device.
Figure 5:
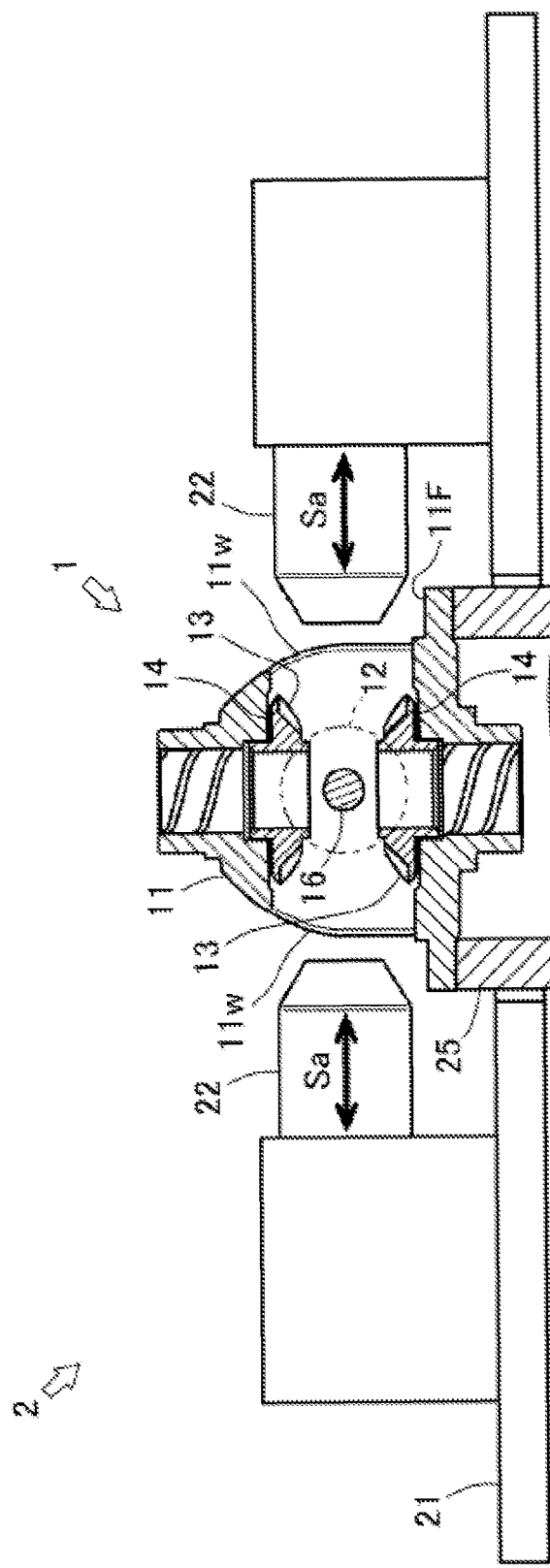
FIG. 5 is a diagram showing how the moving range measurement device operates.
Figure 6A:
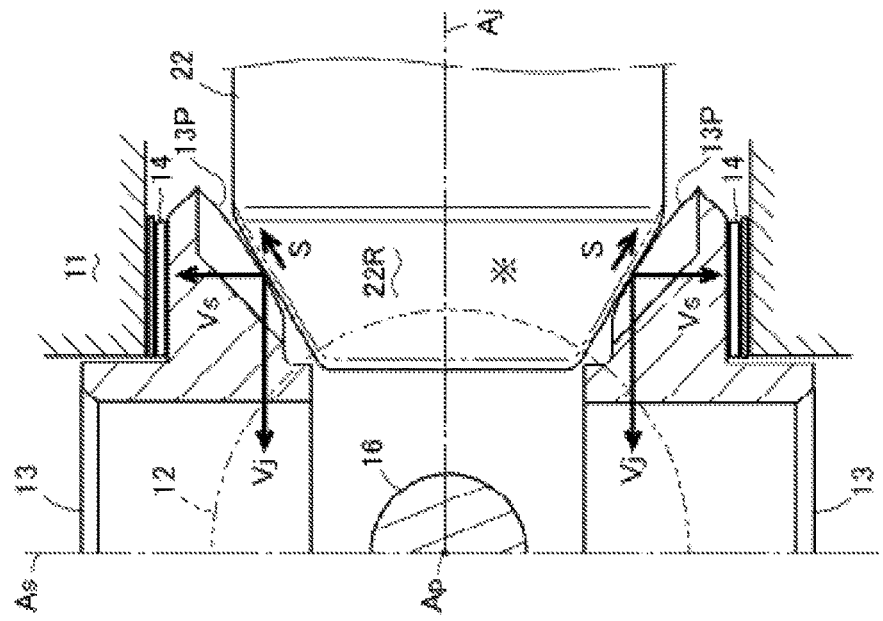
FIG. 6 is a diagram showing a state in which side gears and a jig come into contact with each other and a state in which the jig is further slid.
Figure 6B:
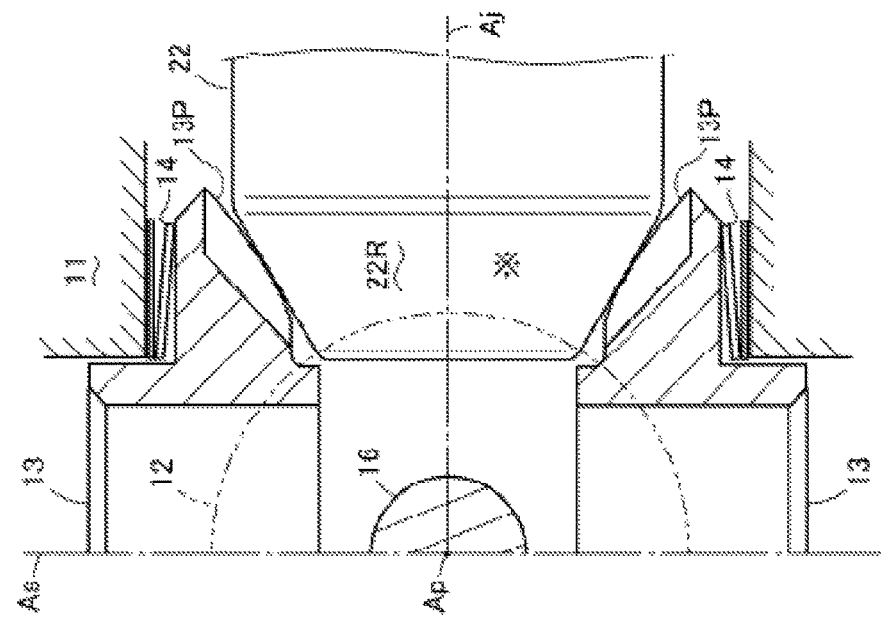

FIG. 4 shows the moving range measurement device 2. FIG. 5 shows how the moving range measurement device 2 operates. FIG. 6 shows in (A) a state in which the side gears 13 and the jig 22 come into contact with each other and FIG. 6 shows in (B) a state in which the jig 22 is further slid.

The moving range measurement device 2 is used in a process of measuring the moving range of the side gears 13 and determining whether the moving range of the side gears 13 that has been measured is appropriate. The moving range measurement device 2 includes a table 21, jigs 22, and an actuator 23.

The table 21 is a component that has a flat upper surface. Further, the table 21 has a central part in which a unit holder 25 is provided and the differential unit 1 is fixed to the unit holder 25. The differential unit 1 is fixed with the flange part 11F downward.

The jigs 22 are arranged above the table 21. The moving range measurement device 2 includes a pair of jigs 22 facing each other. The pair of jigs 22 are in association with a feeding mechanism 26 and are supported so that they are slidable in a direction toward or away from each other (see arrow Sa of FIG. 5). When the jigs 22 slide in a direction in which they approach each other, they are inserted into the differential case 11 from operation windows 11w of the differential case 11. Therefore, the jigs 22 are able to approach the side gears 13 and come into contact with the side gears 13. The jigs 22 slide parallel to the table 21. Therefore, the jigs 22 slide vertically to a central axis direction of the pinion gears 12 (axial center direction of a central axis Ap). The jigs 22 also slide vertically to a central axis direction of the side gears 13 (axial center direction of a central axis As). That is, the differential unit 1 is fixed in such a way that the direction in which the jigs 22 slide satisfies the above relations.

The actuator 23 is arranged on the upper surface of the table 21. The moving range measurement device 2 includes one actuator 23 that slides the pair of jigs 22. The actuator 23 includes, in addition to the feeding mechanism 26 stated above, an electric motor 27 and the like. The feeding mechanism 26 uses a ball screw mechanism and converts a rotational movement into a feeding movement. The actuator 23 is therefore able to slide the jigs 22 in a predetermined direction using the rotary power of the electric motor 27 (see arrow Sa of FIG. 5). While the ball screw mechanism is used in the feeding mechanism 26, it is not limited to this example and another mechanism may be used. Alternatively, one jig 22 may be slid by one actuator 23.

In the following description, the shape of the jigs 22 and how the moving range measurement device 2 operates will be described in detail.

The jigs 22 are formed with a substantially cylindrical shape. Further, each of the jigs 22 is tapered so that the diameter thereof becomes smaller toward the tip part thereof (see * in FIG. 6). That is, each of the jigs 22 is a round bar having a wedge-shaped tip. In this specification, the tapered (wedge-shaped) peripheral surface is defined as a "slope 22R".

As described above, when the jigs 22 are slid in a direction in which they approach each other, they are inserted into the differential case 11 from the operation windows 11w of the differential case 11. Then the tip part of the jig 22 concurrently comes into contact with the respective side gears 13. More specifically, the slope 22R of the jig 22 comes into contact with one side gear 13 and at the same time it comes into contact with the other side gear 13 (see (A) in FIG. 6).

After that, the moving range measurement device 2 further slides the jigs 22. That is, the moving range measurement device 2 slides the jigs 22 in a direction in which they approach each other (the direction in which the respective jigs 22 press the respective side gears 13). Then the jigs 22 move the respective side gears 13 by the tip parts thereof. More specifically, the slope 22R of the jig 22 pushes up one side gear 13 and pushes down the other side gear 13 (see (B) in FIG. 6).

The above technical idea will be described in further detail.

As described above, each of the jigs 22 has a tapered tip part. That is, the jig 22 has the slope 22R having a predetermined angle with respect to a central axis Aj. The slope 22R of the jig 22 is formed so that it is parallel or substantially parallel to a top land 13P of the side gear 13.

Now, the forces by which the jig 22 is slid and the direction in which the jig 22 slides are denoted by an arrow Vj, when it is represented by a vector. The forces by which the jig 22 is slid become the forces that move the side gears 13 via the slope 22R. That is, the forces by which the jig 22 is slid are decomposed and the decomposed forces are used as forces to move the side gears 13. In this way, the side gears 13 move in a direction different from the direction in which the jig 22 slides. Specifically, the side gears 13 relatively move along the slope 22R of the jig 22 (see arrow S in FIG. 6). The forces by which the side gears 13 are slid and the direction in which the side gears 13 move are denoted by an arrow Vs, when it is represented by a vector.

As described above, the moving range measurement device 2 includes the jigs 22 in which the slopes 22R are formed. The moving range measurement device 2 further includes the actuator 23 that slides the jigs 22 in a direction vertical to the central axis direction As of the side gears 13. The jigs 22 are slid to make the slopes 22R come into contact with the side gears 13. Then the jigs 22 are further slid by the actuator 23, whereby the side gears are moved along the slopes. It is therefore possible to move, by using only the actuator 23 that slides the jigs 22 in one direction (0-degree direction), the side gears 13 in another direction (90-degree direction). Accordingly, the moving range measurement device 2 has a simple mechanism formed of one or a small number of actuators 23, whereby the cost can be reduced. Further, since it is sufficient that the jigs 22 be slid and inserted into the differential case 11, the measurement can be easily carried out.

In the moving range measurement device 2, the slope 22R is formed in a circumferential direction with regard to each of the jigs 22 and this slope 22R concurrently comes into contact with the pair of side gears 13. Therefore, by further sliding the jig 22, the two side gears 13 can be concurrently moved along the slope 22R. Specifically, one of the side gears 13 can be moved upward and the other one of the side gears 13 can be moved downward. Therefore, the moving range measurement device 2 has a simple mechanism, whereby the cost can be reduced.

In addition, in the moving range measurement device 2, the side gears 13 are so-called bevel gears. The slope 22R comes into contact with the top lands 13P of the side gears 13. Therefore, there is no need to provide a part with which the jig 22 comes into contact in the side gears 13. It is therefore possible to use the moving range measurement device 2 without changing the structure or the component of the differential unit 1.

Next, other characteristics of the moving range measurement device 2 will be described.

Figure 7A:
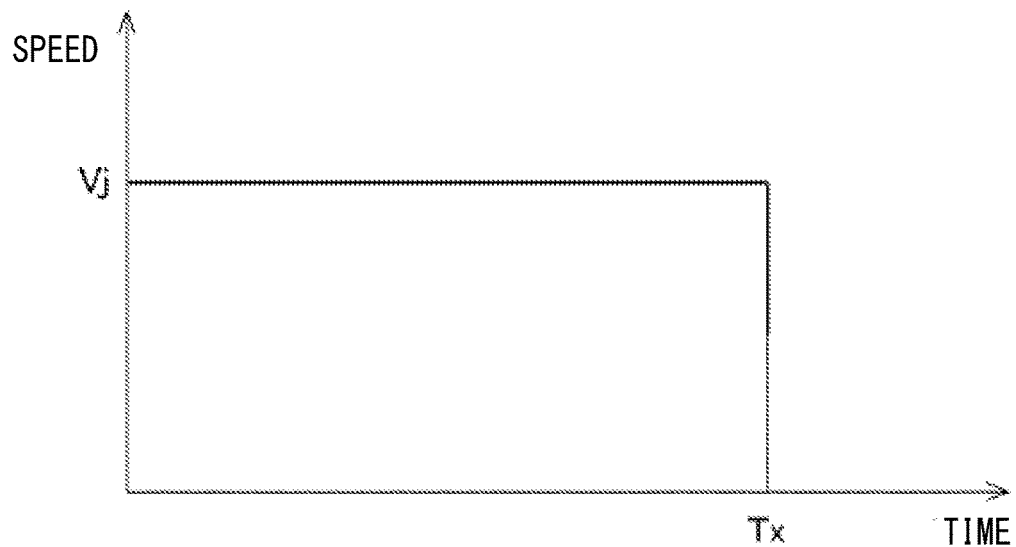
FIG. 7 is a diagram showing changes in a sliding speed of the jig with time and changes in a voltage of an electric motor with time.
Figure 7B:
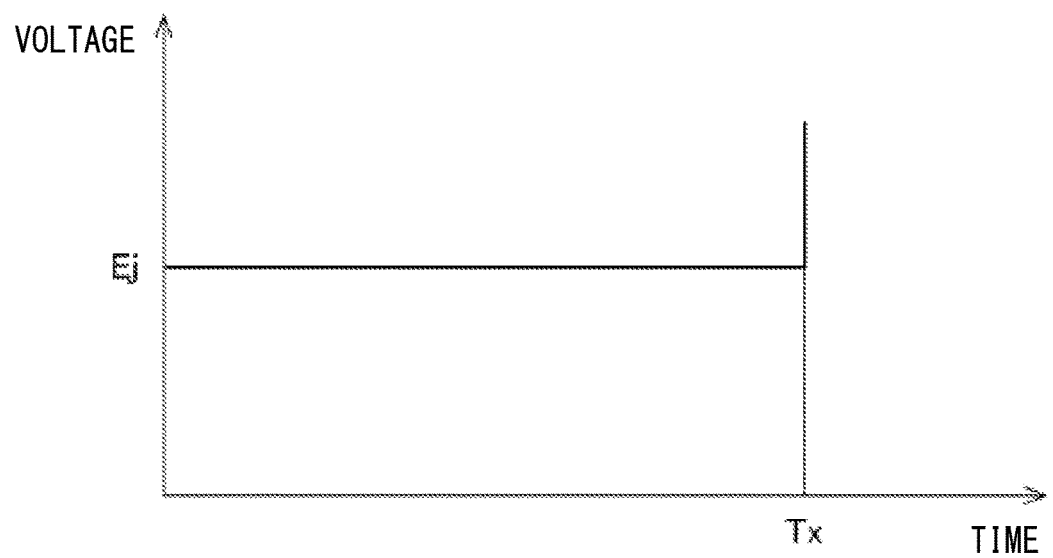

FIG. 7 shows in (A) changes in the sliding speed of the jig 22 with time and shows in (B) changes in the voltage of the electric motor 27.

The moving range measurement device 2 includes a controller 24 (see FIG. 4).

The controller 24 is arranged on the rear side of the table 21. Further, in the moving range measurement device 2, a rotary encoder (not shown) is attached to the feeding mechanism 26. The controller 24 is electrically connected to the rotary encoder and is able to recognize the sliding speed of the jigs 22 from the number of signals per unit time. While the controller 24 is able to recognize the sliding speed of the jigs 22 based on an electric signal from the rotary encoder in this moving range measurement device 2, it is not limited to this example and another device may be used.

As shown in (A) of FIG. 7, the sliding speed Vj of the jig 22 rapidly decreases at time Tx. This means that the spring 14 completely contracts at time Tx and the side gears 13 cannot move any more. At this time, the controller 24 sends an electric signal to stop the electric motor 27 to stop the actuator 23. The controller 24 thus recognizes the limit of movement of the side gears 13.

As described above, the moving range measurement device 2 includes the controller 24 capable of recognizing the sliding speed of the jigs 22. The controller 24 stops the actuator 23 when the sliding speed of the jigs 22 rapidly decreases. It is therefore possible to recognize the limit of movement of the side gears 13. Accordingly, it is possible to measure the moving range of the side gears 13.

As another embodiment, the present invention may be formed as follows.

That is, a voltage sensor (not shown) is attached to the electric motor 27. The controller 24 is electrically connected to the voltage sensor and is able to recognize the sliding speed of the jigs 22 by monitoring a signal. While the controller 24 is able to recognize the sliding speed of the jigs 22 based on an electric signal from the voltage sensor in this embodiment, it is not limited to this example and another device may be used.

As shown in (B) of FIG. 7, the voltage Ej of the electric motor 27 rapidly increases at time Tx. This means that the spring 14 completely contracts at time Tx and the side gears 13 cannot move any more. At this time, the controller 24 sends an electric signal to stop the electric motor 27 to stop the actuator 23. The controller 24 thus recognizes the limit of movement of the side gears 13.

As described above, the moving range measurement device 2 includes the controller 24 capable of recognizing the voltage of the electric motor 27. The controller 24 stops the actuator 23 when the voltage of the electric motor 27 rapidly increases. It is therefore possible to recognize the limit of movement of the side gear 13. Accordingly, it is possible to measure the moving range of the side gears 13.

INDUSTRIAL APPLICABILITY

The present invention is applicable to a device for measuring a moving range of a side gear used in a differential unit.

REFERENCE SIGNS LIST

1 DIFFERENTIAL UNIT
11 DIFFERENTIAL CASE

12 PINION GEAR
13 SIDE GEAR
13P TOP LAND
14 SPRING
2 MOVING RANGE MEASUREMENT DEVICE
21 TABLE
22 JIG
22R SLOPE
23 ACTUATOR
Aj CENTRAL AXIS
Ap CENTRAL AXIS
As CENTRAL AXIS
Vj VECTOR
Vs VECTOR

The invention claimed is:

1. A device for measuring a moving range of a side gear used in a differential unit, the differential unit comprising:
   a differential case;
   a side gear arranged inside the differential case; and
   a spring that biases the side gear in a direction parallel to a central axis direction of the side gear, wherein:
   the device comprises:
      a jig in which a slope is formed, the jig being slidable in a direction vertical to the central axis direction of the side gear; and
      an actuator that slides the jig, and
      the actuator slides the jig to make the jig move toward the side gear in a state in which the slope of the jig is in contact with the side gear, to thereby move the side gear along the slope.

2. The device for measuring the moving range of the side gear according to claim 1, wherein:
   the side gear is a bevel gear, and
   the slope is in contact with a top land of the side gear.

3. The device for measuring the moving range of the side gear according to claim 1, further comprising a controller capable of recognizing a sliding speed of the jig,
   wherein the controller stops the actuator when the sliding speed of the jig rapidly decreases.

4. The device for measuring the moving range of the side gear according to claim 1, further comprising a controller, wherein:
   the actuator comprises an electric motor, and
   the controller is configured to be able to recognize a voltage of the electric motor and stops the actuator when the voltage of the electric motor rapidly increases.

* * * * *